United States Patent
Shim

(10) Patent No.: US 6,526,074 B1
(45) Date of Patent: Feb. 25, 2003

(54) LASER SCANNING APPARATUS

(75) Inventor: Hyeong-Seog Shim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 319 days.

(21) Appl. No.: 09/627,302

(22) Filed: Jul. 27, 2000

(30) Foreign Application Priority Data

Jul. 31, 1999 (KR) .............................................. 99-31548

(51) Int. Cl.[7] .................................................. H01S 3/10
(52) U.S. Cl. ............................................. 372/24; 372/9
(58) Field of Search ...................................... 372/24, 9

(56) References Cited

U.S. PATENT DOCUMENTS 4,834,477 A * 5/1989 Tomita et al. ............... 350/6.2
4,982,205 A * 1/1991 Hasegawa .................... 346/108
5,012,485 A * 4/1991 Ohmori ........................ 372/108

* cited by examiner

*Primary Examiner*—Paul Ip
*Assistant Examiner*—Leith A Al-Nazer
(74) *Attorney, Agent, or Firm*—Robert E. Bushnell, Esq.

(57) ABSTRACT

A laser scanning apparatus comprises a light source, a deflecting unit, a rotating guide, a drive motor and an image forming lens. The light source emits laser beams. The deflecting unit deflects the laser beams emitted by the light source into a scanning direction. The rotating guide has a plurality of guide holes for scanning the laser beams at a constant velocity, the rotating guide accommodating the deflecting unit and being positioned so that the light source lies on central axis of the rotating guide. The drive motor rotates the rotating guide while engaged with it, and the image forming lens focuses the laser beams passing through the guide holes of the rotating guide onto a surface.

25 Claims, 6 Drawing Sheets

LASER SCANNING APPARATUS

CLAIM OF PRIORITY

This application makes reference to, incorporates the same herein, and claims all benefits accruing under 35 U.S.C. §119 from my application LASER SCANNING APPARATUS filed with the Korean Industrial Property Office on Jul. 31, 1999 and there duly assigned Serial No. 31548/1999.

BACKGROUND OF THE INVENTION

The present invention relates, in general, to laser scanning apparatuses and, more particularly, to a laser scanning apparatus that has a rotating guide instead of a polygon mirror so as to scan laser beams in a scanning direction at a constant velocity.

DESCRIPTION OF THE RELATED ART

In general, a laser scanning apparatus is employed in a laser printer, a facsimile, etc. The laser scanning apparatus is an optical device that traverses a surface with laser beams so as to reproduce or transmit a desired image in the form of dots, or traverses a document or the like with laser beams so as to read data on the document or the like for use by a computer or computerized device.

A laser scanning apparatus can include a laser beam source, various lenses, and a polygon mirror for deflecting the laser beam and directing it through various optical devices toward a receiving element, such as a photosensitive drum. Such an apparatus has several disadvantages.

For example, such a laser scanning apparatus operates in such a manner as to require extreme precision in the fabrication of its component parts (for example, the polygon mirror and the various lenses or other optical elements). Moreover, a great degree of precision is required in the manufacture of reflecting surfaces used in such an apparatus. Finally, extreme precision in the assembly of the apparatus is required, and the assembly can be complex and difficult. All of these requirements tend to increase the cost of manufacture of such a product.

SUMMARY OF THE INVENTION

Accordingly, the present invention has been developed with the above problems in mind, and an object of the present invention is to provide a laser scanning apparatus which is relatively simple to manufacture and assemble, and which has reduced manufacturing cost. This is achieved principally by elimination of the polygon mirror.

In order to accomplish the above object, the present invention provides a laser scanning apparatus, comprising: a light source for emitting laser beams; a deflecting unit for deflecting laser beams emitted from the light source to a scanning direction; a rotating guide having a plurality of guide holes for scanning laser beams at a constant velocity, the rotating guide accommodating the deflecting unit and being positioned so that the light source lies on a central axis of the rotating guide; a drive motor for rotating the rotating guide while it is engaged with the rotating guide; and an image forming arrangement for focusing the laser beams which having passed through the guide holes of the rotating guide onto a surface.

Preferably, the deflecting unit includes a conical mirror which is mounted on the central axis of the rotating guide, and which has a surface inclined at a certain angle.

Preferably, the deflecting unit further includes a collimating lens for collimating the laser beams emitted from the light source so that they are parallel with one another as they proceed toward the conical mirror, the collimating lens being mounted between the light source and the conical mirror.

Preferably, the deflecting unit further includes a direction restricting unit for restricting the progressive direction of laser beams deflected by the conical mirror within a scanning direction.

Preferably, the direction restricting unit is cylindrically shaped, is closed at its bottom and open at its top, and has an opening for restricting the direction of transmission of the laser beams deflected by the conical mirror to a scanning direction.

Preferably, light absorbing material is applied to the inner surface of the sidewall of the direction restricting unit, the conical mirror is fixed to the bottom of the direction restricting unit, and the width of the opening of the restricting unit coincides with the effective scanning width in a scanning direction.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
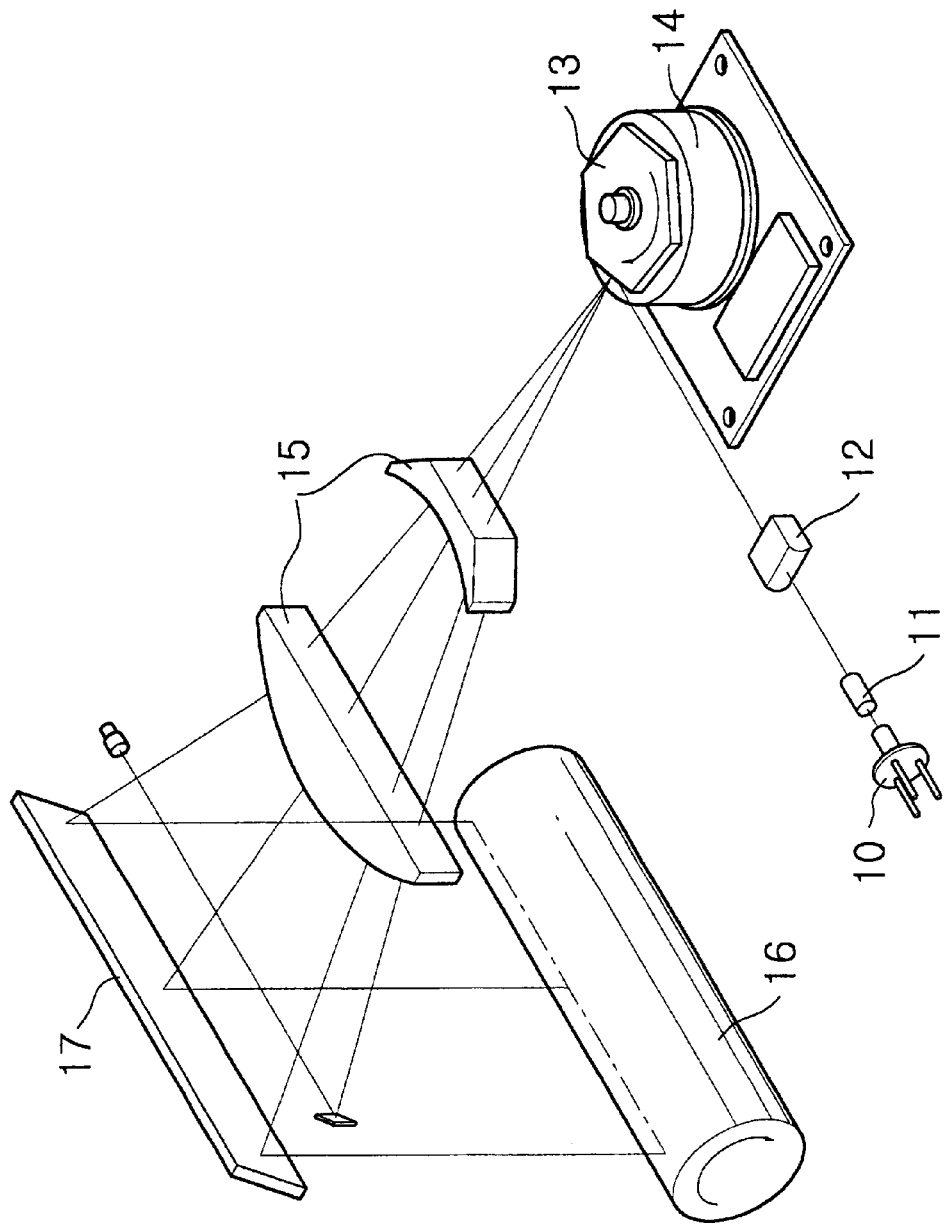
FIG. 1 is a perspective view of a laser scanning apparatus.

Reference should now be made to the drawings, in which the same reference numerals are used throughout the different drawings to designate the same or similar components.

As illustrated in FIG. 1, a laser scanning apparatus comprises a laser diode 10 for emitting laser beams, a collimating lens 11 for reforming the laser beams emitted from the laser diode 10 into beams parallel to an optical axis, and a cylindrical lens 12 for converging the parallel beams into a sub-scanning direction.

The laser scanning apparatus further comprises a polygon mirror 13 for deflecting laser beams which have passed through the cylindrical lens 12 to a direction perpendicular to the sub-scanning direction, that is, to a main-scanning direction, a drive motor 14 for driving the polygon mirror 13, image forming lenses 15 for further deflecting the laser beams deflected by the polygon mirror 13, and a reflecting mirror 17 for reflecting the laser beams deflected by the image forming lenses 15 so that the laser beams are directed and focused onto the outer surface of photosensitive drum 16.

The polygon mirror 13 is a beam reflecting element that has a plurality of reflecting surfaces arranged vertically with regard to its direction of rotation, and it functions to deflect the laser beams to the main-scanning direction. A line of image information is recorded on the photosensitive drum 16 as one of the deflecting surfaces of mirror 13 is rotated to a certain angle. The performance of such a laser scanning apparatus largely depends upon the surface uniformity of the polygon mirror 13, the exactitude of the angles that neighboring reflecting surfaces form, and the perpendicularity of the deflecting surfaces with regard to the direction of rotation of mirror 13. As a result, high accuracy is required for the reflecting surfaces, so that the manufacturing cost of the laser scanning apparatus is increased.

Additionally, since the effective surface length is minimized so as to reduce the size of the polygon mirror 13, the axis of rotation of the polygon mirror 13 and an optical axis should maintain a proper deflection. As a result, since accurate assembly is required for the apparatus, the assembly of its parts to form the apparatus is difficult.

Referring to FIGS. 2 to 6, a laser scanning apparatus in accordance with the present invention comprises a laser diode 100 for emitting laser beams, a deflecting unit 120 for deflecting laser beams emitted from the laser diode 100 to a scanning direction, a rotating guide 130 having a plurality of guide holes 131 for scanning laser beams at a constant velocity, the rotating guide 130 accommodating the deflecting unit 120 and being positioned so that the laser diode 100 lies on a central axis of the rotating guide 130, a drive motor 140 for rotating the rotating guide 130 while engaged with the rotating guide 130, image forming lenses 170 for focusing the laser beams which have passed through the guide holes 131 of the rotating guide 130 onto a surface, a reflecting mirror 180, a photosensitive drum 190, a horizontal synchronous mirror 200 for deflecting laser beams which have passed through the image forming lenses 170 into a horizontal direction, and a photosensor 210 for receiving and synchronizing laser beams deflected by the horizontal synchronous mirror 200.

Figure 2:
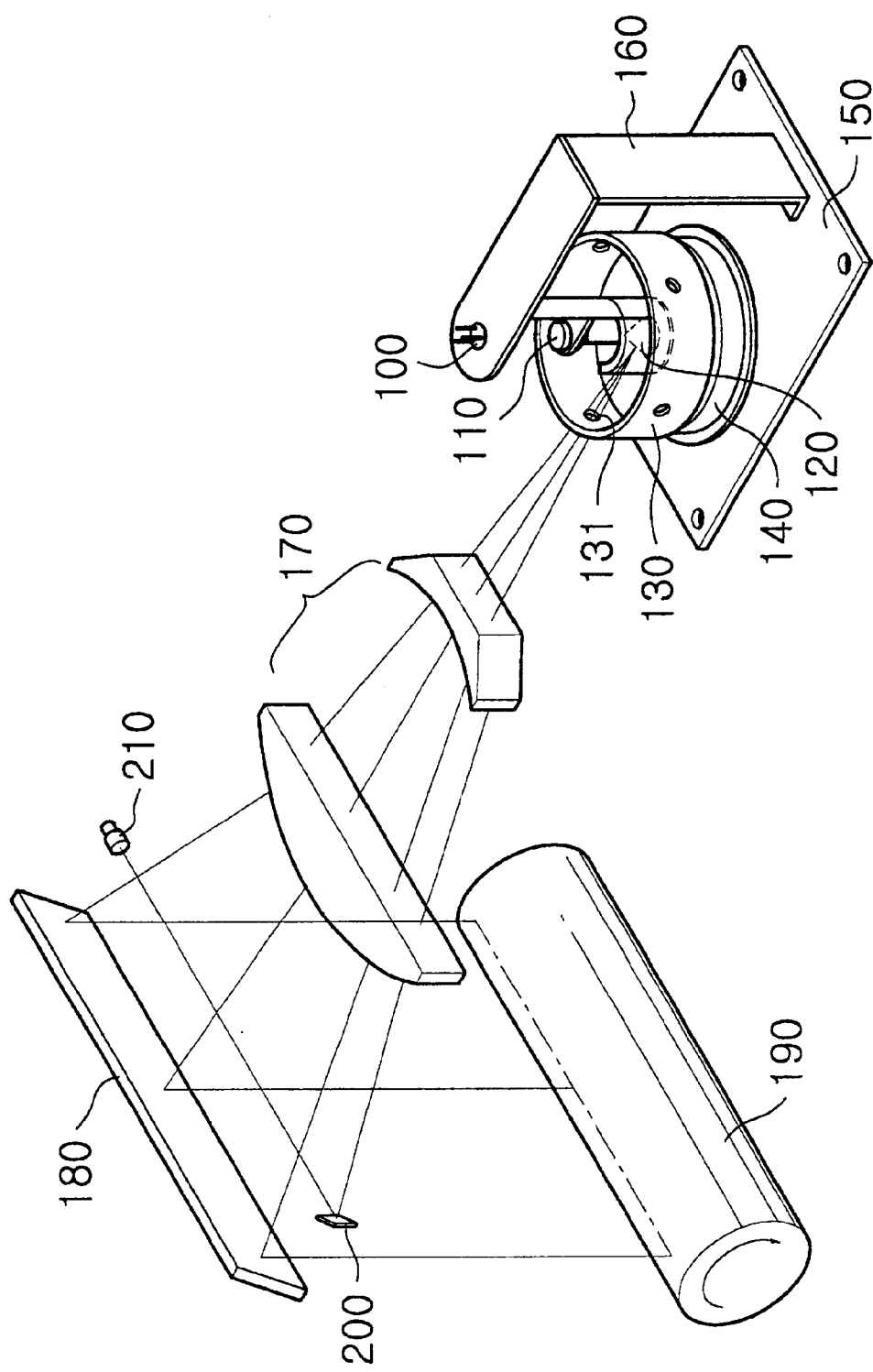
FIG. 2 is a perspective view of a laser scanning apparatus in accordance with the present invention.
Figure 3:
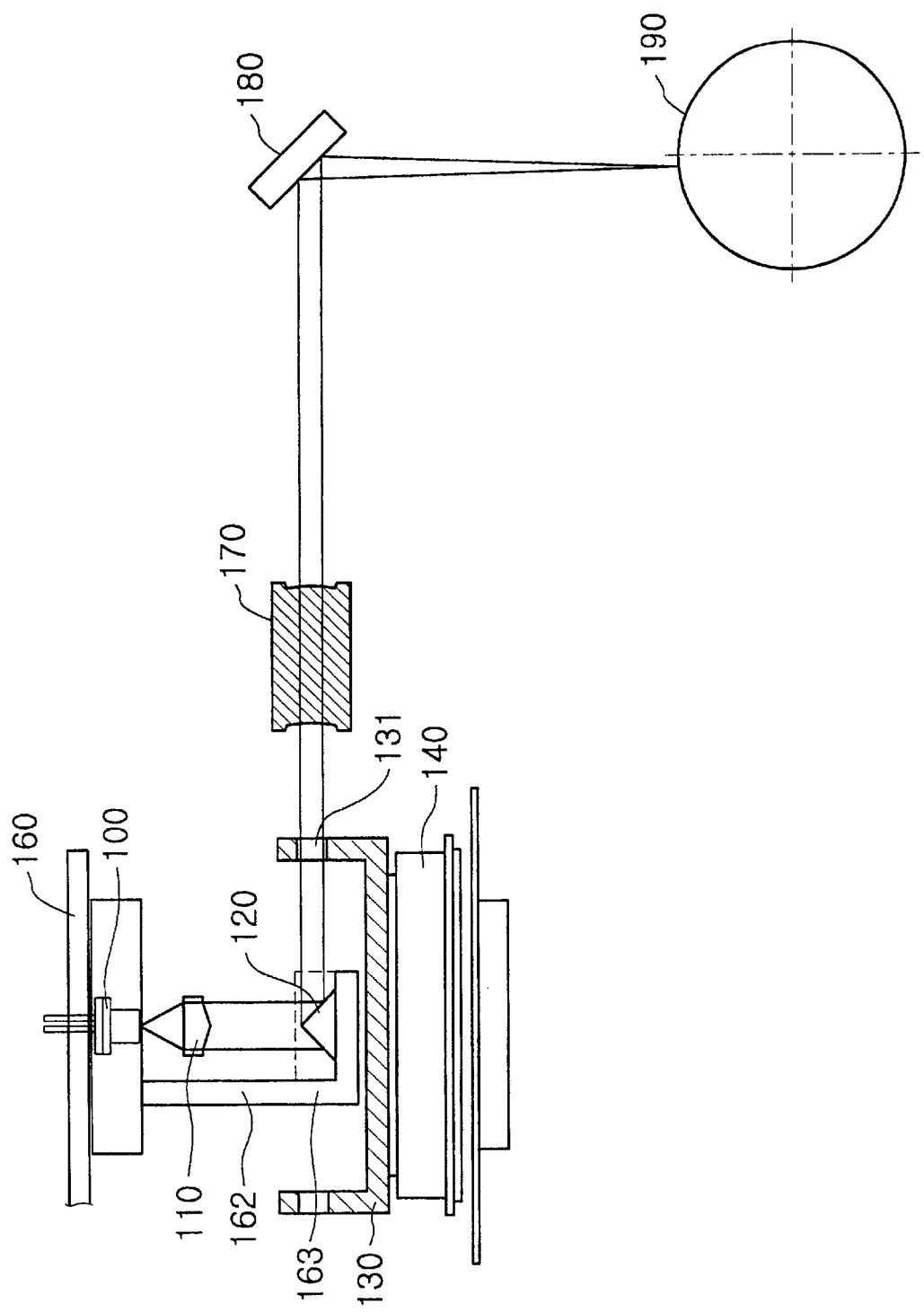
FIG. 3 is a side view of the laser scanning apparatus of the present invention.
Figure 4:
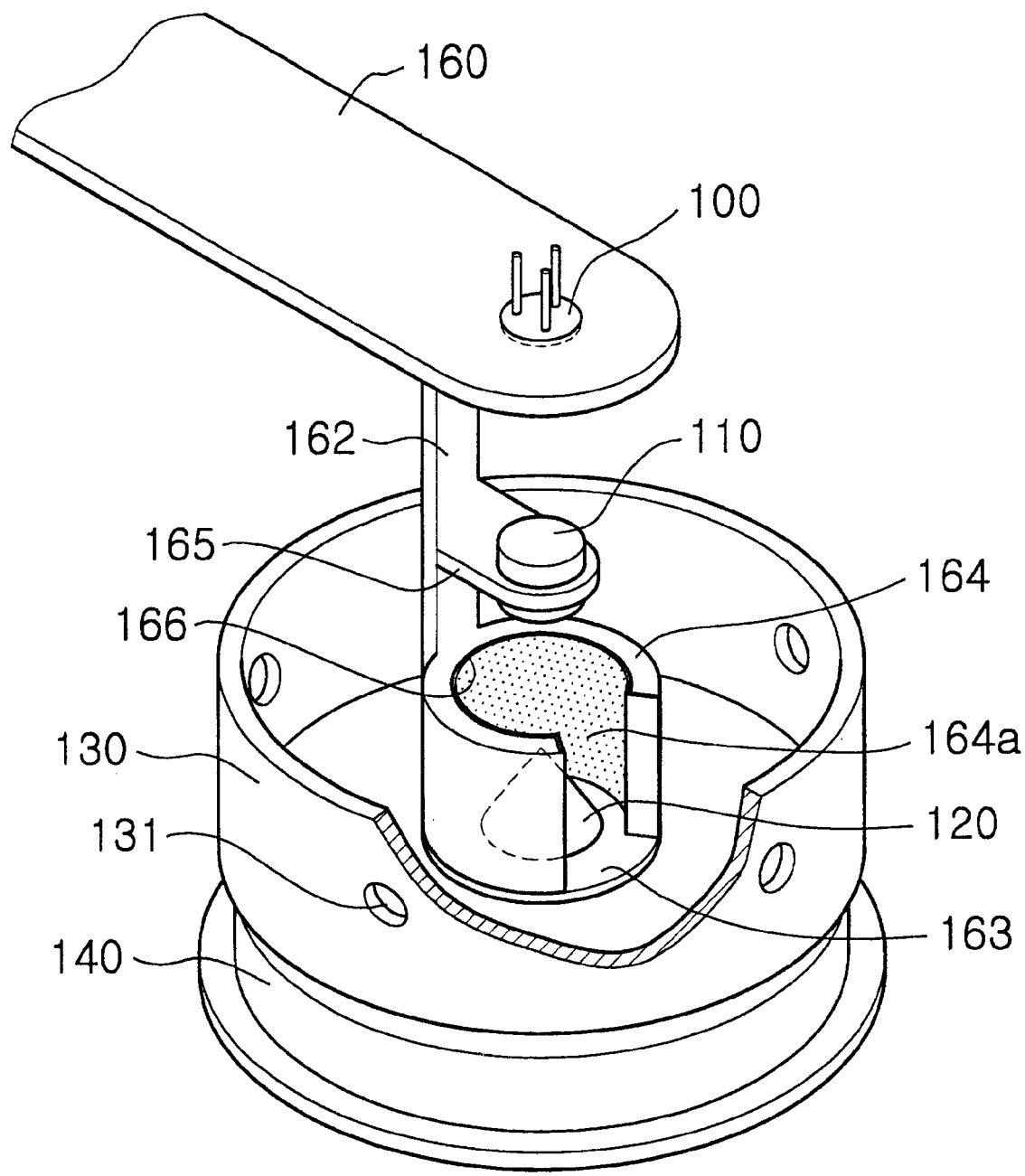
FIG. 4 is a partially cutaway perspective view showing the arrangement of the rotating guide, the laser diode, the collimating lens and the conical mirror of the invention.

Referring to FIG. 2, the drive motor 140 is mounted on a base plate 150, and the rotating guide 130 is rotated while engaged with the drive motor 140. The rotating guide 130 is cylindrically shaped, is closed at its bottom where it comes into contact with the drive motor 140, and is open at its top. The guide holes 131 are formed along the sidewall of the rotating guide 130, and, referring to FIG. 6, six guide holes 131 are formed along the side wall of the rotating guide 130 while being spaced apart from each other by an interval θ2 of 60°.

A bracket 160 (FIG. 2) is bent perpendicularly, is positioned so that the lower end of its vertical portion is fixed to the base plate 150 and the free end of its horizontal portion is situated over the rotating guide 130, and has a hole 167 (FIG. 5) at the free end of the horizontal portion. The laser diode 100 is fitted into the hole 167.

A support 162 (FIG. 3) extends vertically and parallel to the central axis of the rotating guide 130 from the free end of the bracket and has a horizontal support portion 165 (FIG. 4) for supporting the collimating lens 110 while the collimating lens 110 is spaced apart from the laser diode 100.

A direction restricting unit 164 (FIG. 4) having a conical mirror 120 in its central portion is combined with the lower end of the support 162. The conical mirror 120 deflects laser beams emitted from the laser diode 100 into the scanning direction. The direction restricting unit 164 is accommodated in the interior of the rotating guide 130 while being spaced apart from the rotating guide 130. The direction restricting unit 164 is cylindrically shaped and is closed at its bottom 163 and open at its top. An opening 164a is formed on the sidewall of the direction restricting unit 164 so as to restrict the direction of transmission of the laser beams deflected by the conical mirror 120 to the scanning direction. The opening 164a is positioned in opposition to one of the guide holes 131 of the rotating guide 130. The width of the opening 164a preferably coincides with the effective scanning width in the scanning direction.

The direction restricting unit 164 serves to restrict the direction of transmission of laser beams deflected by the conical mirror 120 to the scanning direction. For this purpose, light absorbing material 166 having a superior light absorption property is applied to the inner surface of the sidewall of the direction restricting unit 164. The light absorbing material 166 so employed may be black material, such as platinum black, or an insulating body on which a plurality of minute holes is formed.

Figure 5:
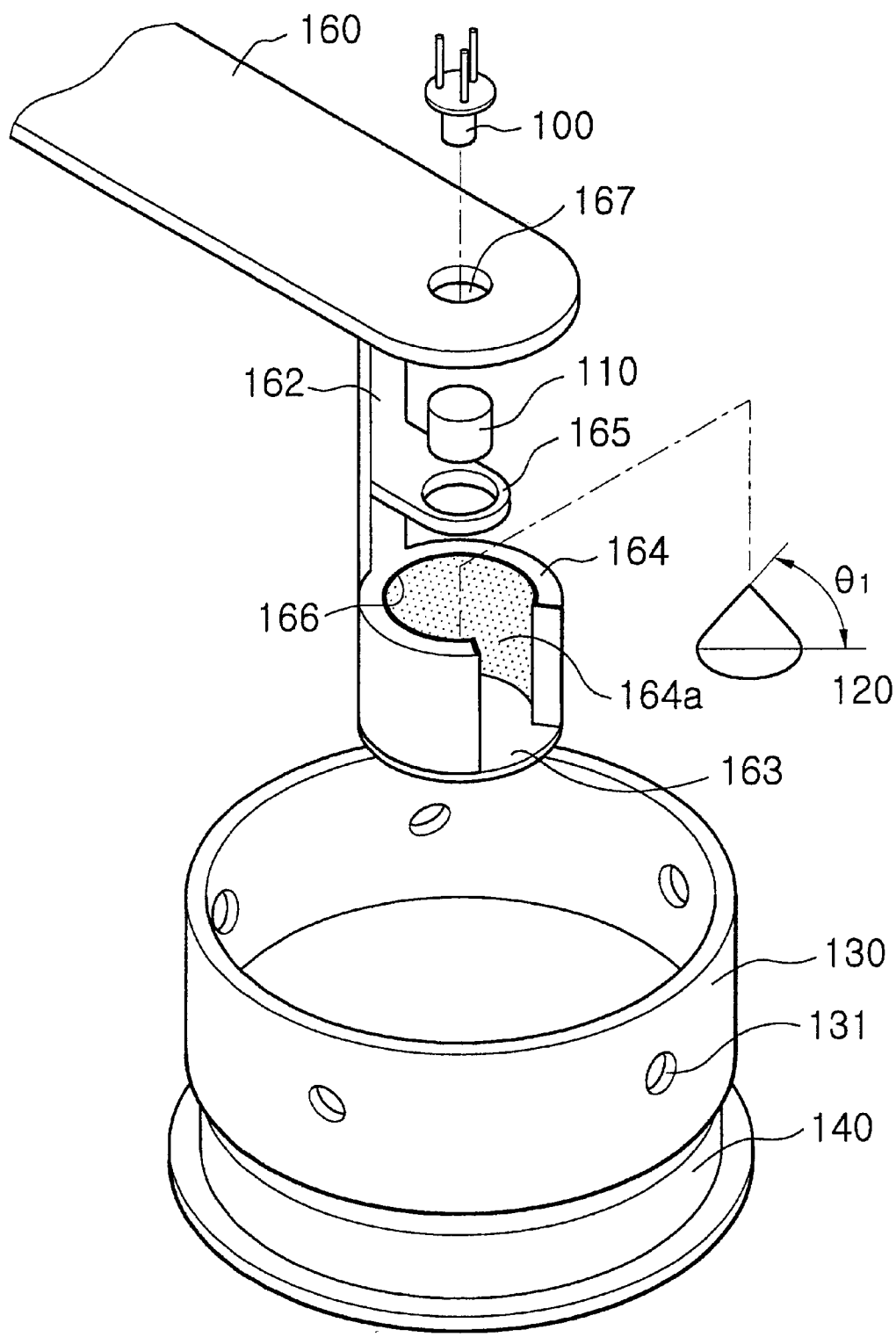
FIG. 5 is an exploded view of the rotating guide, the laser diode, the collimating lens and the conical mirror.
Figure 6:
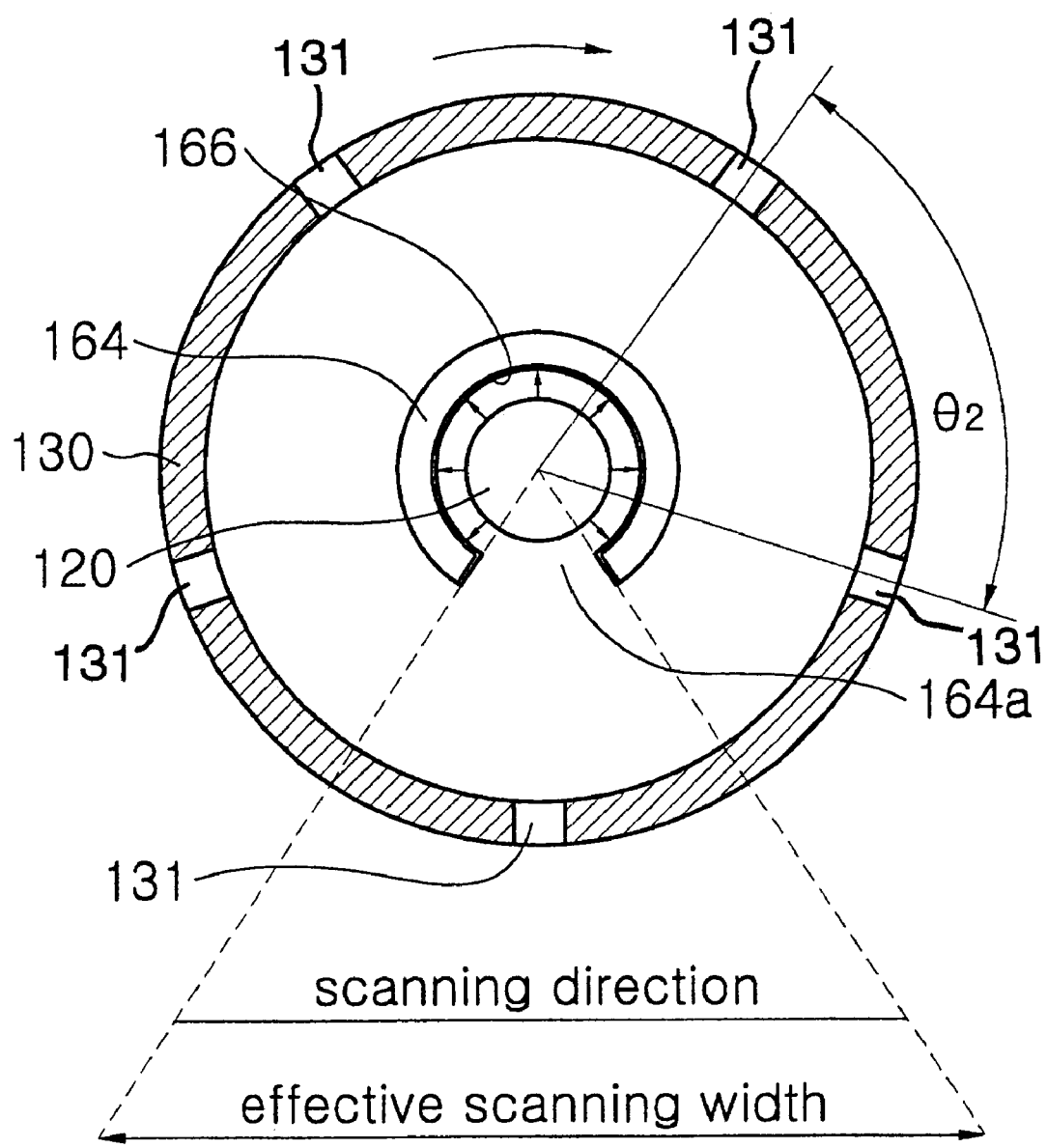
FIG. 6 is a plan view showing the operation of a rotating guide in accordance with the present invention.

As illustrated in FIG. 5, the conical mirror 120 is mounted on the bottom 163 of the direction restricting unit 164 so as to receive laser beams at its apex, and has a conical angle θ1 of, for example, 45° so as to deflect scanned laser beams. Additionally, the respective centers of the laser diode 100, the collimating lens 110 and the conical mirror 120 are positioned to lie on the central axis of the rotating guide 130.

Hereinafter, the operation of the laser scanning apparatus of the present invention is described.

Laser beams are emitted along the central axis of the rotating guide 130 from the laser diode 100. After the laser beams pass through the collimating lens 110, the laser beams travel in parallel with the central axis of the rotating guide 130 and, finally, arrive at the apex of the conical mirror 120.

Since the inclined surface of the conical mirror 120 has an angle of 45°, the laser beams reflected by the conical mirror 120 are reflected into a direction perpendicular to the emitted direction, that is, the scanning direction. At this point, the reflected laser beams are reflected radially from the conical mirror 120. The majority of the reflected laser beams are absorbed by light absorbing material 166, while only laser beams passing through the opening 164a of the direction restricting unit 164 travel to the inner surface of the sidewall of the rotating guide 130.

As the rotating guide 130 is rotated by the drive motor 140 in the scanning direction, laser beams which have arrived at the inner surface of the sidewall of the rotating guide 130 are scanned at a constant velocity through the guide holes 131 that are arranged at intervals of a certain angle along the sidewall.

Subsequently, laser beams which have passed through the guide holes 131 of the rotating guide 130 pass through the image forming lenses 170, are reflected by the reflecting mirror 180, and progress to the photosensitive drum 190, thereby completing the scanning process.

Meanwhile, since laser beams which have passed through the opening 164a of the direction restricting unit 164 may be reflected partially, light absorbing material is preferably applied to the inner surface of the sidewall of the rotating guide 130, as described above.

As also described above, the present invention provides a laser scanning apparatus which is capable of preventing position errors due to the inclination of the reflecting surfaces of a polygon mirror because the polygon mirror is not employed in this apparatus and, consequently, a cylindrical lens is unnecessary.

In addition, the present invention provides a laser scanning apparatus which is capable of minimizing the distance of laser beam scanning, thereby reducing the manufacturing cost as well as the size of the laser scanning apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A laser scanning apparatus, comprising:
    a light source for emitting laser beams;
    deflecting means for deflecting the laser beams emitted from said light source to a scanning direction;
    a rotating guide having a plurality of guide holes for scanning the laser beams at a constant velocity, the rotating guide accommodating said deflecting means and being positioned so that the light source lies on a central axis of the rotating guide;
    a drive motor for rotating the rotating guide while engaged with the rotating guide; and
    image forming means for focusing the laser beams scanned by the guide holes of said rotating guide on a surface.

2. The apparatus according to claim 1, wherein said deflecting means includes a conical mirror mounted on the central axis of said rotating guide and having a surface inclined at a certain angle.

3. The apparatus according to claim 2, wherein said deflecting means further includes a collimating lens for causing the laser beams emitted from said light source to proceed parallel to one another toward said conical mirror, said collimating lens being mounted between said light source and said conical mirror.

4. The apparatus according to claim 2, wherein said deflecting means further includes a direction restricting unit for restricting direction of transmission of the laser beams deflected by the conical mirror to a scanning direction.

5. The apparatus according to claim 4, wherein said direction restricting unit is cylindrically shaped, and has a bottom which is closed, a top which is open, and an opening for restricting the direction of transmission of the laser beams deflected by the conical mirror to the scanning direction.

6. The apparatus according to claim 5, wherein light absorbing material is applied to an inner surface of a sidewall of said direction restricting unit.

7. The apparatus according to claim 5, wherein said conical mirror is fixed to the bottom of said direction restricting unit.

8. The apparatus according to claim 5, wherein a width of said opening coincides with an effective scanning width in the scanning direction.

9. The apparatus according to claim 1, wherein said guide holes are formed along a sidewall of said rotating guide at intervals of a certain angle.

10. A laser scanning apparatus, comprising:
    a light source for emitting laser beams;
    deflecting and scanning means for deflecting and scanning, at a constant velocity, the laser beams emitted from said light source into a scanning direction; and
    image forming means for forming an image by focusing the deflected and scanned laser beams on a surface;
    wherein said deflecting and scanning means includes:
        a base,
        a drive motor mounted on said base,
        a rotating guide having a bottom fixed to said drive motor, a top which is open, and a sidewall on which a plurality of guide holes is formed,
        a bracket having a lower end fixed to said base and an upper end on which said light source is mounted,
        a support extending from said bracket in parallel with a central axis of said rotating guide,
        a collimating lens spaced apart from said light source by a certain distance, and
        a direction restricting unit for restricting transmission of laser beams deflected into the scanning direction, said direction restricting unit being mounted to a lower end of said support.

11. The apparatus according to claim 10, wherein said direction restricting unit is cylindrically shaped, and has a bottom which is closed, a top which is open, and an opening for restricting a direction of transmission of the laser beams deflected into the scanning direction.

12. The apparatus according to claim 11, wherein light absorbing material is applied to an inner surface of a sidewall of said direction restricting unit.

13. The apparatus according to claim 11, wherein a width of said opening coincides with an effective scanning width in the scanning direction.

14. The apparatus according to claim 10, wherein centers of said light source and said collimating lens are positioned to lie on a central axis of said rotating guide.

15. The apparatus according to claim 10, wherein said deflecting and scanning means further comprises a conical mirror mounted to a lower end of said support.

16. The apparatus according to claim 15, wherein centers of said light source, said collimating lens and said conical mirror are positioned to lie on a central axis of said rotating guide.

17. A laser scanning apparatus, comprising:
    light source means for emitting laser beams;
    deflecting means for deflecting the laser beams emitted from said light source means into a scanning direction;
    rotating guide means surrounding said deflecting means and having a plurality of guide holes for scanning the laser beams, the rotating guide means being positioned so that the light source means lies on a central axis of the rotating guide means;
    drive motor means for rotating the rotating guide means; and
    image forming means for focusing the laser beams which are scanned by the guide holes of said rotating guide means onto a surface.

18. The apparatus according to claim 17, wherein said deflecting means includes a conical mirror mounted on a central axis of said rotating guide means and has a surface inclined at a certain angle.

19. The apparatus according to claim 18, wherein said deflecting means further includes a collimating lens for causing the laser beams emitted from said light source means to travel parallel to one another toward said conical mirror, said collimating lens being mounted between said light source means and said conical mirror.

20. The apparatus according to claim 18, wherein said deflecting means further includes a direction restricting unit for restricting direction of transmission of the laser beams deflected by the conical mirror to a scanning direction.

21. The apparatus according to claim 20, wherein said direction restricting unit is cylindrically shaped, and has a bottom which is closed, a top which is open, and an opening for restricting the direction of transmission of the laser beams deflected by the conical mirror to the scanning direction.

22. The apparatus according to claim 21, wherein light absorbing material is applied to an inner surface of a sidewall of said direction restricting unit.

23. The apparatus according to claim 21, wherein said conical mirror is fixed to the bottom of said direction restricting unit.

24. The apparatus according to claim 21, wherein a width of said opening coincides with an effective scanning width in the scanning direction.

25. The apparatus according to claim 17, wherein said guide holes are formed along a sidewall of said rotating guide at intervals of a certain angle.

* * * * *